June 18, 1929.                G. MYERS                1,717,934
                              AUTO SIGNAL
                          Filed May 11, 1927
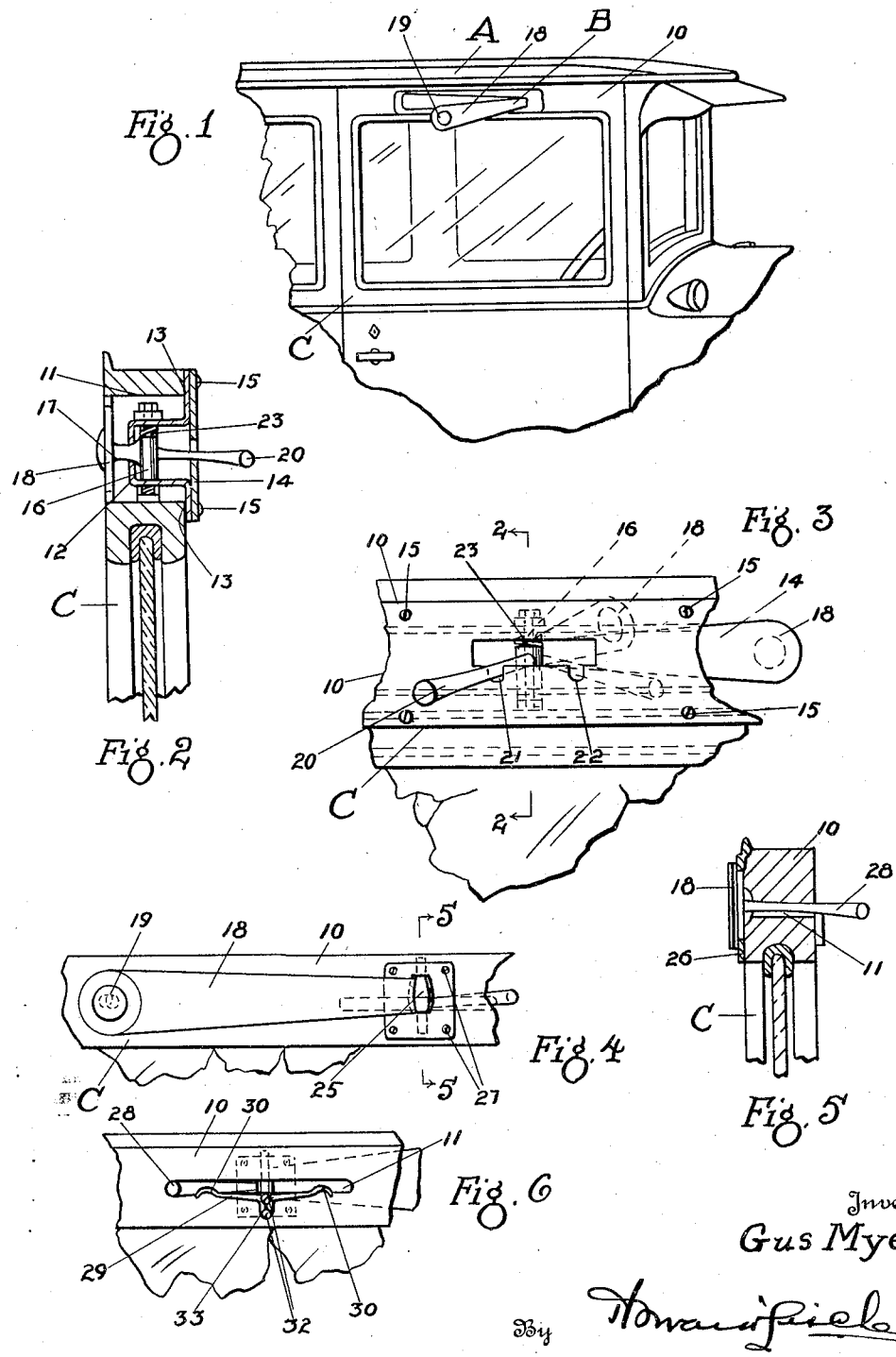

Patented June 18, 1929.

1,717,934

UNITED STATES PATENT OFFICE.

GUS MYERS, OF FARGO, NORTH DAKOTA.

AUTO SIGNAL.

Application filed May 11, 1927. Serial No. 190,487.

My invention relates to a signal for automobiles which is designed to be incorporated in the frame or door frame of the same so that in a simple inexpensive manner a signal is provided in any of the door frames or body of the automobile, which can be easily operated to provide a signal to indicate the direction of travel of the automobile.

A feature of the invention resides in providing a signal which is built into the frame of the automobile by inserting a casing which supports the signal in a collective unit within an opening formed in the door or body of the automobile and adapted to receive the unit so that the same may be readily replaced in its entirety very easily or is readily accessible.

It is also a feature to provide a signal which is operable through a slot in the frame of an automobile. This signal is particularly adapted to closed cabs or bodies of automobiles and by a simple slot in the frame the signal can be attached to the body of the auto and operated from within the same by a lever means adapted for the purpose.

These features, together with other details and objects of the invention will be more fully and clearly set forth in the specification and claims.

In the drawings forming part of the specification:

Figure 1 is a partial view of an automobile body showing my signal attached to one of the doors thereof.

Figure 2 is a section on the line 2—2 of Figure 3.

Figure 3 is a view of the inner side of the door of the auto, showing only a portion of the same and illustrating the operating handle of the signal.

Figure 4 is an outer view of an alternative form of my signal, only a portion of the door being illustrated.

Figure 5 is a section on the line 5—5 of Figure 4.

Figure 6 is an inside view of a portion of the door, showing the spring for holding the operating arm of the signal, illustrated in Figures 4 and 5.

In the drawings the automobile A, only a portion of which is illustrated is adapted to carry my signal B in the door C of the same. This signal B is placed up in the top member 10 of the door or body portion of the automobile. Figure 1 illustrates the signal partly turned out into operative position.

The member 10 of the body of the auto which may be a portion of the door C or the body portion or frame of the automobile body, is cut out with a slot 11 into which the casing 12, which is formed channel-shape and which is provided with flange members 13 on each side thereof, is adapted to fit in the slot 11. The casing 12 is adapted to be covered on the inside with the plate 14 and the screws 15 hold the plate in place. The casing 12 is adapted to support the shaft 16 which extends through the sides of the casing and is pivoted therein in a manner to permit the shaft 16 to rotate. A shank 17 is adapted to connect the signal arm 18 with the shaft 16. The shank 17 extends through a slot formed in the casing 12. The signal arm 18 may be provided with a signal light 19 on the outer end of the same if it is desired, or this member 19 may be of any illuminous nature so that it will show up when a light is directed against it to provide a signal.

An operating arm 20 extends from the shaft 16 inwardly of the door C and is adapted to fit into the notches 21 and 22 to hold the signal into and out of operative position. By means of a spring 23 positioned on the shaft 16 the shaft 16 is held downward ordinarily with the operating handle 20 resting in one of the notches 21 or 22.

However, a sufficient play is provided in the shaft 16 between the ends of the same so that by lifting upward on the handle 20 against the spring 23 the handle 20 can be lifted out of either of the notches 21 and 22 and the signal moved into the direction desired.

The entire signal is held in a unit in and to the casing 12 so that it can be disengaged from the door frame 10 by removing the screws 15 and sliding the signal in its entirety out of the slot 11. This permits the signal to be replaced or repaired or changed if it is desired.

In Figures 4, 5 and 6 I have illustrated a further simplified form of my signal and in this construction the slot 11 through the door frame is narrow so that only a slight opening is formed in the member 10 of the door to provide this slot 11 which is illustrated in Figures 5 and 6.

In this construction the signal arm 18 is mounted on the shaft 25 and the shaft 25 is adapted to be held rotatable in the plate 26 which is held to the door frame by the screws 27. In this construction the plate 26 is screwed on to the outside of the door C on the member 10 as illustrated in Figure 4, and the operating lever 28 extends through the slot 11.

The operating lever 28 is just the same as the lever 20 excepting that it is long enough to extend through the slot 11 from the outside. In this construction I provide a locking spring 29 with the spring loop ends 30 in each end thereof and by means of the screws 32 extending through the central depending portion 33 I fasten the spring 29 in position so that the loop portions 30 intersect the slot 11 and extend in close proximity to the ends of the same. In this manner the spring 29 functions to hold the operating end of the lever 28 in position to hold the signal 18 into or out of signaling position in the same manner as is true of the signal described in Figures 1, 2 and 3, excepting that in this construction the spring 23 is not used and no casing 12 is employed to hold the signal in operative position.

My signal is of a very inexpensive construction yet being effective to be operated in a manner so as to provide a signal for any closed car which can be operated from the inside by engaging either the handle 20 or 28 to throw the signal into or out of signaling operation. I have found my signal to be very practical in view of its simplicity and inexpensive construction, and the signal arm 18 is clearly visible from the front and back of the automobile to which it is attached.

In accordance with the patent statutes I have described the principles of operation of my signal and while I have illustrated a particular formation and design of the same, I desire to have it understood that the invention may be carried out by other means and applied to uses other than those above set forth within the scope of the following claims, without departing from the spirit of my invention.

I claim:

1. A signal for an automobile adapted to extend from the frame thereof, a vertically extending pivot member for said signal located within the frame, and an operating lever extended through the frame and projecting inside of the automobile and means including notches upon a plate member for holding the signal arm into or out of signalling position.

2. A signal for an automobile including, a unit casing adapted to hold the parts thereof collectively together, said unit extending within the frame of an automobile and collectively removable therefrom.

3. A signal for an automobile comprising, a casing within the frame of the automobile, a shaft extending vertically through said casing, a plate for covering said casing, a signal arm connected to said shaft, and an operating arm adapted to operate said shaft.

4. A signal including, a signal arm adapted to extend horizontally along the outer side of an automobile body, a slot extending through the body, a shaft located in said slot for supporting said signal arm, means including a casing connected to said body for supporting said shaft pivotally to the body, and an operating lever extending directly into the body in a manner to operate said signal into or out of signalling position.

5. A signal for an automobile comprising, a signal arm, an operating arm, means fixed to the inside panel of the automobile for engaging said operating arm to hold the same in different positions, and a slot formed in the body of the automobile to receive the signal and operating arm.

6. A signal for an automobile comprising, a signal arm, means for pivoting said arm, an operating arm, a slot including notches upon the inside panel of the automobile for holding said operating arm, and spring means for holding said operating arm into said notches.

7. A signal for an automobile including, a signal arm, a light member carried by the free end of said arm, means for pivotally supporting the other end of said arm to the body of the automobile, operating means extending through a slot in the body of said automobile, and means including notches upon the inside panel of the automobile for engaging said operating arm to hold said signal arm into and out of signalling position.

GUS MYERS.